(12) United States Patent
Wang et al.

(10) Patent No.: US 8,538,229 B1
(45) Date of Patent: Sep. 17, 2013

(54) PLUGGABLE VARIABLE OPTICAL ATTENUATORS AND METHODS FOR MAKING THE SAME

(75) Inventors: Xinzhong Wang, Cupertino, CA (US); Daoyi Wang, San Jose, CA (US); Yao Li, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 207 days.

(21) Appl. No.: 12/624,237

(22) Filed: Nov. 23, 2009

Related U.S. Application Data (60) Provisional application No. 61/209,945, filed on Mar. 13, 2009.

(51) Int. Cl.
*G02B 6/00* (2006.01)

(52) U.S. Cl.
USPC .......................................................... 385/140

(58) Field of Classification Search
USPC .......................................................... 385/140
See application file for complete search history.

(56) References Cited

U.S. PATENT DOCUMENTS

| | | | | |
|---|---|---|---|---|
| 5,745,634 A * | 4/1998 | Garrett et al. | ................. | 385/140 |
| 6,137,941 A * | 10/2000 | Robinson | ...................... | 385/140 |
| 6,614,982 B2 * | 9/2003 | Barrett | .......................... | 385/140 |
| 6,625,377 B2 * | 9/2003 | Chang | ............................ | 385/140 |
| 6,718,114 B2 * | 4/2004 | Hong et al. | ..................... | 385/140 |
| 7,054,537 B2 * | 5/2006 | Lim et al. | ....................... | 385/140 |
| 7,330,624 B2 * | 2/2008 | Isenhour et al. | .............. | 385/134 |
| 7,346,240 B1 * | 3/2008 | He et al. | .......................... | 385/48 |
| 2002/0018636 A1 * | 2/2002 | Bischel et al. | ................ | 385/140 |
| 2002/0097977 A1 * | 7/2002 | Morimoto et al. | ............ | 385/140 |
| 2002/0136523 A1 * | 9/2002 | Brown et al. | ................. | 385/140 |
| 2002/0141727 A1 * | 10/2002 | Ema et al. | ..................... | 385/140 |
| 2004/0091229 A1 * | 5/2004 | Li et al. | ......................... | 385/140 |
| 2005/0047745 A1 * | 3/2005 | Ao et al. | ........................ | 385/140 |
| 2007/0041085 A1 * | 2/2007 | Nakano et al. | ........... | 359/341.42 |
| 2008/0205845 A1 * | 8/2008 | Wang et al. | .................... | 385/140 |
| 2009/0103867 A1 * | 4/2009 | Huang et al. | .................... | 385/48 |

FOREIGN PATENT DOCUMENTS

JP  2005-096725  * 5/2005

* cited by examiner

*Primary Examiner* — Charlie Peng
(74) *Attorney, Agent, or Firm* — Joe Zheng (57) ABSTRACT

Various designs of pluggable variable optical attenuator (VOA) are disclosed. A pluggable VOA has an optical fiber adaptor connected to an internal VOA via different fiber optical interface configurations. At least a pair of ports is provided to accept optical fibers or external optical fiber ferrules for optical pluggability. The VOA is controlled electronically or manually. To facilitate a control of the VOA via a hosting system, an electronic device and/or interface is provided. External commands take the control of the VOA and set an attenuation level within a specification when the pluggable variable optical attenuator device is connected to a hosting system.

16 Claims, 10 Drawing Sheets

PLUGGABLE VARIABLE OPTICAL ATTENUATORS AND METHODS FOR MAKING THE SAME

CROSS-REFERENCE TO RELATED APPLICATION

This application claims the benefits of U.S. Provisional Application No. 61/209,945, filed Mar. 13, 2009, and entitled "A Pluggable Variable Optical Attenuator and Methods of Making", which is hereby incorporated by reference for all purposes.

BACKGROUND OF THE INVENTION

1. Field of the Invention

The invention is generally related to the area of optical communications. In particular, the invention is related to pluggable variable optical attenuators.

2. The Background of Related Art

To meet the ever-increasing demands for high bandwidth and more flexibility in modern communication networks, utilizing optical fiber networks capable of transmitting multiplexed channel signals are becoming increasingly popular. DWDM (Dense Wavelength Division Multiplexing) is one of the key technologies for such optical fiber communication networks. DWDM employs multiple wavelengths and channels in a single fiber to transmit in parallel different communication protocols and bit rates. Simultaneously transmitting several channels in a single optical fiber at different wavelengths can expand the transmission capacity of the existing optical transmission systems in multiple folds, and facilitate many useful functions in optical networks.

The channel signals may come from different sources and may have been transmitted over different mediums, resulting in different power levels. Without carefully tuning the power levels of the channel signals that are to be combined or multiplexed, the multiplexed signals in some channels may be distorted. To ensure that all optical devices or systems receive proper levels of optical signals, optical attenuation devices are frequently used in an optical network to adjust the optical signal strength before they reach an optical device.

Variable Optical Attenuator (VOA) is a versatile optical signal power management tool that can help optical network designers and operators to achieve flexibilities in designs and applications. VOA's are widely used in current optical networks from long-haul to metro and even access networks. The adjustment of a VOA can either be manual, thus MVOA, through an adjusting knob or electrical (e.g., via voltage or current signal), thus EVOA. Upon application of a control command, a VOA can attenuate an optical signal arrived at its input optical fiber port so that its output fiber port has lowered the optical power of the same signal by a desired amount. The attenuation is typically measured by decibel or dB and a VOA typically has a continuous tuning capability from "0" dB to "x" dB attenuation based on the application need and the device design specifications. Currently, all VOA's used for optical communications applications are terminated with fiber ports that can be spliced into an optical network directly or with fiber connectors per application requirements.

Figure 1A:
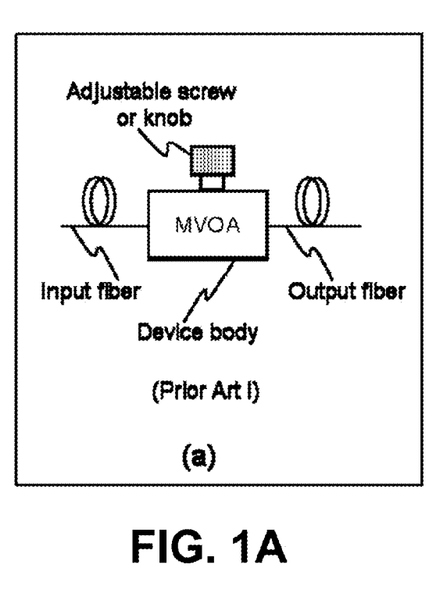
FIG. 1A shows an exemplary prior art MVOA with bare fiber input and output ports.
Figure 1B:
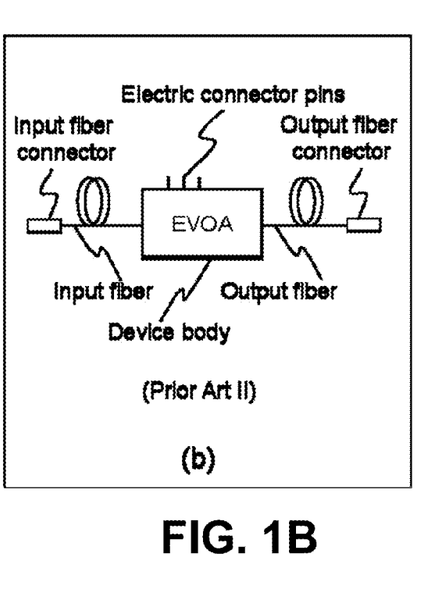
FIG. 1B shows an exemplary prior art EVOA with electrical connector pins and fiber connector ports.

FIG. 1A shows an MVOA whose attenuation is adjusted manually and fiber ports of both input and output sides are not specially prepared and thus may be spliced by its user. FIG. 1B shows an EVOA where attenuation is adjusted through an electrical signal and its fiber ends are terminated with a pair of fiber connectors.

Pluggable devices are widely available in electronic forms these days. A device that belongs to the pluggable category typically needs to be turned on and function as soon as it is inserted into an electrical connector receptacle or adaptor port. When it is unplugged from such a receptacle, neither the system that hosts the pluggable device nor the pluggable device itself would be damaged. Pluggable devices may be added or removed from a system without interrupting the synchronization between the devices and the system. Therefore, it is not required to have a power reset when replacing or upgrading such devices. Pluggable devices add on a good deal of system application upgrade flexibilities and are becoming more and more popular for electronics.

The advances in opto-electronics also allow people to expand communication transmitters and receivers or the so-called transceivers and transponders into the pluggable domain. Various industry formats for such devices are available: Small Form Pluggable (SFP) is an example. Other examples that allow pluggable applications include XFP, I2C, RS-232, USB, Dual-port RAM, Ethernet, and etc. However, up to today pluggable optical devices has not penetrated into optical passive device, such as the VOA domain.

This invention disclosure intends to introduce various systems to allow VOA devices to be added into the pluggable application categories. The invention is focused on the optical pluggable domain while some devices are also electrically pluggable.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

Various designs of pluggable variable optical attenuator (VOA) are disclosed. According to one aspect of the invention, the pluggable VOA has an optical fiber adaptor connected to an internal VOA via different fiber optical interface configurations. At least a pair of ports is provided to accept optical fibers or external optical fiber ferrules for optical pluggability. The VOA is controlled electronically or manually.

According to another aspect of the present invention, a beam blocker or a tilting reflecting mirror is part of the VOA. By adjusting the beam blocker or the mirror, a portion of a light beam can be attenuated according to a requirement. It should be noted that VOAs with other types of attenuation scheme may also be used. To facilitate a control via a hosting system, an electronic device and/or interface is provided. External commands take the control of the VOA and set an attenuation level within a specification when the pluggable variable optical attenuator device is connected to a hosting system.

The present invention may be implemented as a method, an apparatus or a part of a system. According to one embodiment, the present invention is a pluggable variable optical attenuator device, the device comprising: a variable optical attenuator (VOA); and an optical fiber adaptor coupled to the VOA and having a set of ports for accepting at least an input optical fiber and an output optical fiber, wherein a light beam from the input optical fiber is attenuated by the VOA, and the attenuated light beam is coupled to the output optical fiber. Depending on implementation, the VOA may be controlled electronically or manually.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2-7B. However, those skilled in the art will readily appreciate that the detailed description given herein with respect to these figures is for explanatory purposes as the invention extends beyond these limited embodiments.

Figure 2:
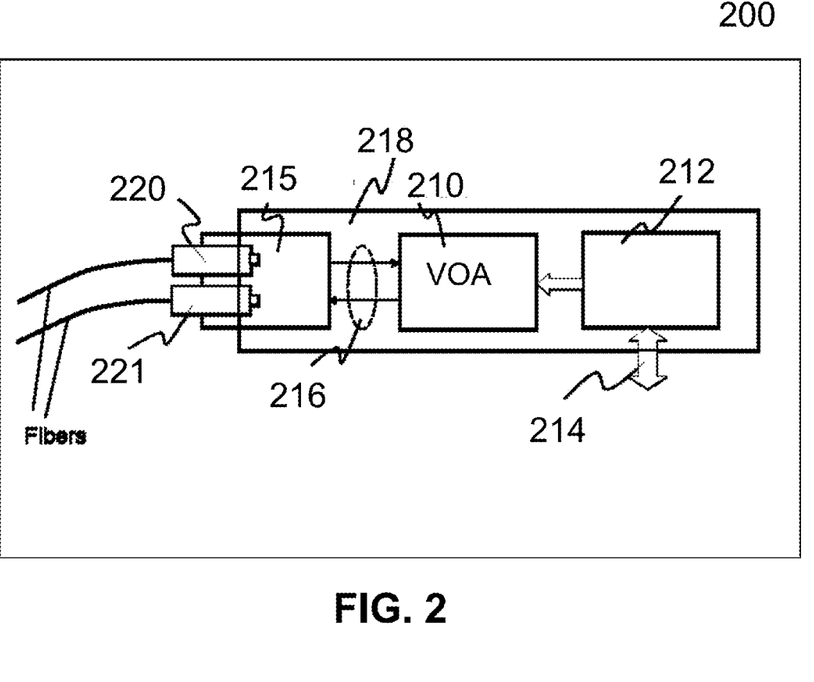
FIG. 2 shows an exemplary EVOA with optical and electrical pluggabilities according one embodiment of the present invention.

Referring now to the drawings, in which like numerals refer to like parts throughout the several views. FIG. 2 shows an exemplary system diagram of a pluggable EVOA device 200 having ports for both electrical and optical pluggability. The system 200 contains a miniaturized EVOA device 210, a control electronic system 212 that powers and controls the attenuation of the EVOA as wells an interface capability to facilitate the electrical pluggability through an electrical connector 214. The system 200 further contains an optical fiber adapter 215 and an optical interface 216 for optical pluggability by mating an external fiber connector pairs to that of the internal EVOA device 210, and a mechanical housing 218 that hosts all the above mentioned parts. It shall be noted that the electrical interface 214 can be in any forms of standardized electronics formats used in industry, such as SFP, XFP, I2C, RS232, USB, Dual-port RAM, Ethernet, etc., or even a proprietary interface for customer-specific requirements. The optical interface 216 can take fiber connectors such as LC, SC, MU, E-2000, FC, ST, SMU, etc., or any other non-industry standard connectors.

The EVOA can be adjusted through control commands provided by needs created externally but through the above-mentioned electrical interface 214 and control system 212 that delivers via a combination of voltage and current signals suitable to drive and set the EVOA to the right attenuation. Before the electrical connector is plugged into a hosting system, the EVOA that has a reset capability could be completely transparent, i.e., in a minimum attenuation state, or it could be in an opaque, i.e., in a particularly high attenuation state. Once the electrical plugging is completed, the external commands can take the control of the device and sets an attenuation level within specification.

For each such pluggable VOA, there are two optical ports in the optical fiber adapter 215, one for input fiber connector 220 and the other for output fiber connector 221. The connecting mechanism at the fiber adaptor 215 on the pluggable VOA device is designed to be sufficiently stable and repeatable to ensure the optical signals to maintain high fidelity and stability.

Figure 3:
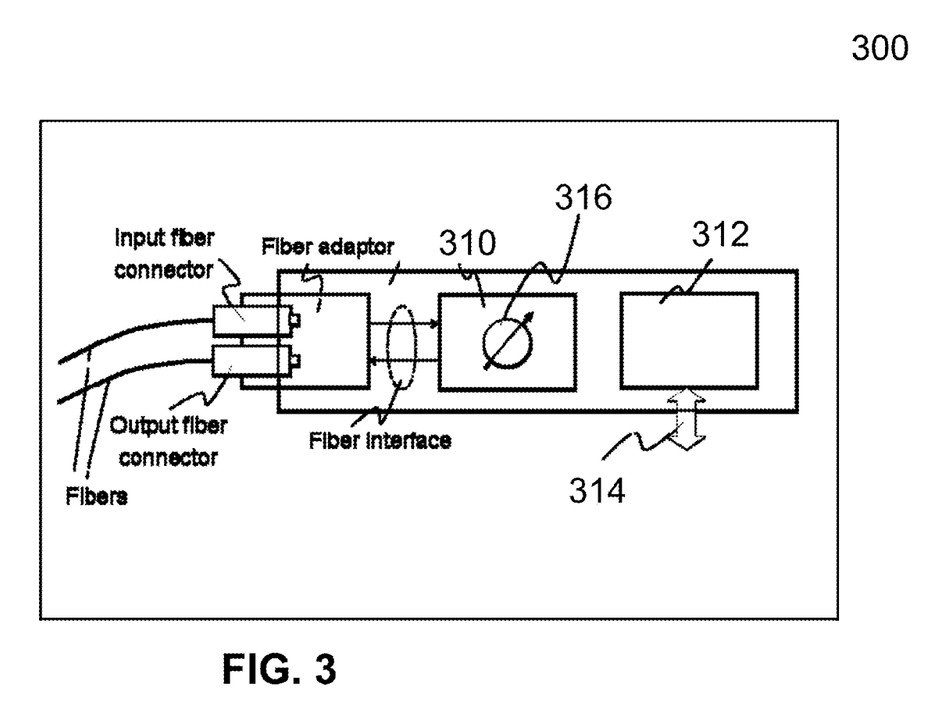
FIG. 3 shows an exemplary MVOA with optical and electrical pluggabilities according one embodiment of the present invention.

FIG. 3 shows an exemplary pluggable MVOA 300 with optical and electrical pluggabilities according one embodiment of the present invention. One of the main differences between a pluggable MVOA 300 and a pluggable EVOA 200 is that the MVOA 300 needs to be adjusted by a knob 316, a dial, or a screw and thus it has neither control electronics nor its interface to the MVOA device 310. The pluggable MVOA 300 simply provides an optically pluggable interface to save the use of fiber pigtails to be spliced with an external system fiber ports or to be connectorized with a pair of external connectors via an external fibre adaptor. Such an application does allow the fibers to be exposed externally outside a system panel. The electrical circuit 312 on board and its interface 314 can allow such a device to register or report its existance in the network.

Figure 4:
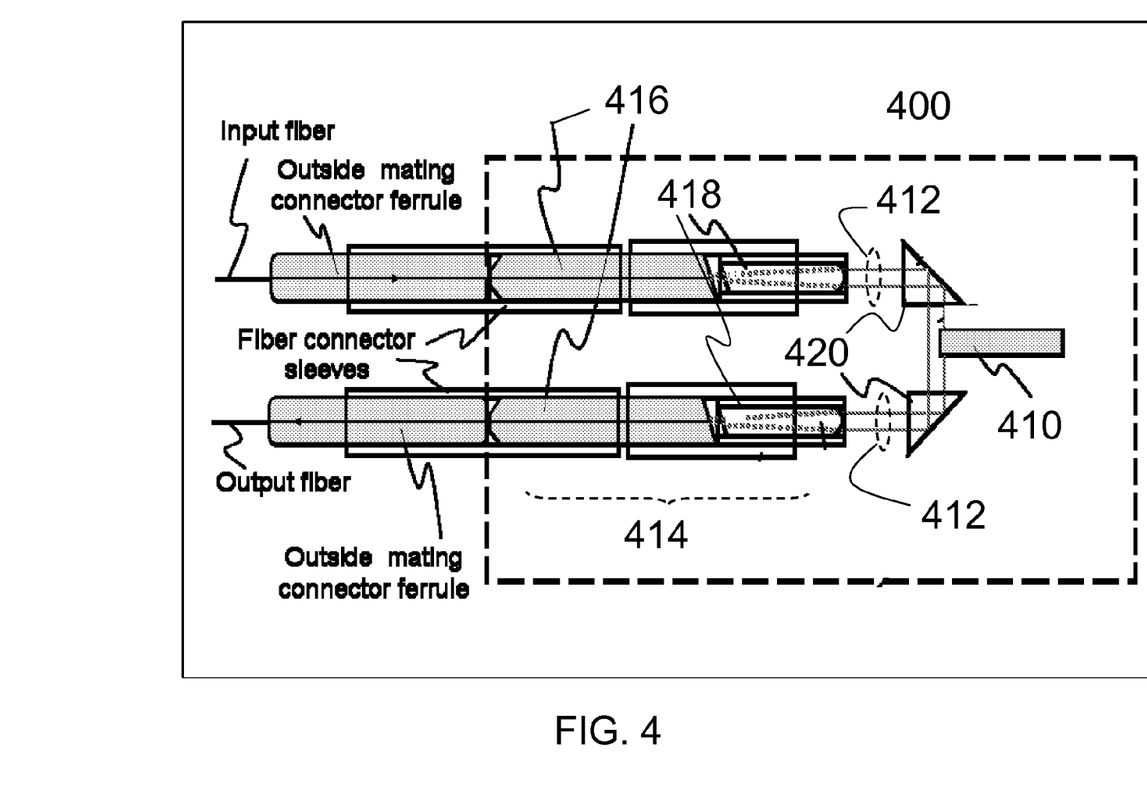
FIG. 4 shows an embodiment of an optically pluggable VOA with direct interface between a VOA device and a fiber adaptor.

FIG. 4 shows an optically pluggable VOA with direct interface between a VOA device and a fiber adaptor that shall host external plugging fiber connectors. Shown in the drawing is a beam blocking type VOA that could be either a MVOA or an EVOA device. That is, its light attenuating mechanism is facilitated by a light beam blocker 410 on an actuator which could be controlled manually or electrically. The collimated light beam 412 is generated between a pair of fiber collimators 414 each comprising a connector fiber ferrule or capillary 416 and a lens 418. To fold the beam back to the same direction needed for this setup, a set of prisms, or reflectors 420 are used. Details such as how to control the beam blocker so that it can have good repeatability and fine resolutions are not further described herein, various feedback control mechanisms through the use of sensors may be used. An example of controlling the a beam blocker and feedback control mechanism may be referenced in U.S. Pat. No. 7,504,630, which is hereby incorporated by reference.

The beam folding structure allows both input and output pluggable ports to face the same direction or one one side of the device. In the embodiment shown in FIG. 4, each fiber adaptor has the simplest structure that shares a common fiber ferrule between one of the collimators 414 and a sleeve tube. In this way, no additional transition component is needed leading to a shortest device dimension along the fiber axial direction. When the pluggable VOA is used for an optical plugging device, a user only needs to plug in an external pair of connectors and ensure firm contact between each pair of mating fiber ferrule ends.

Figure 5A:
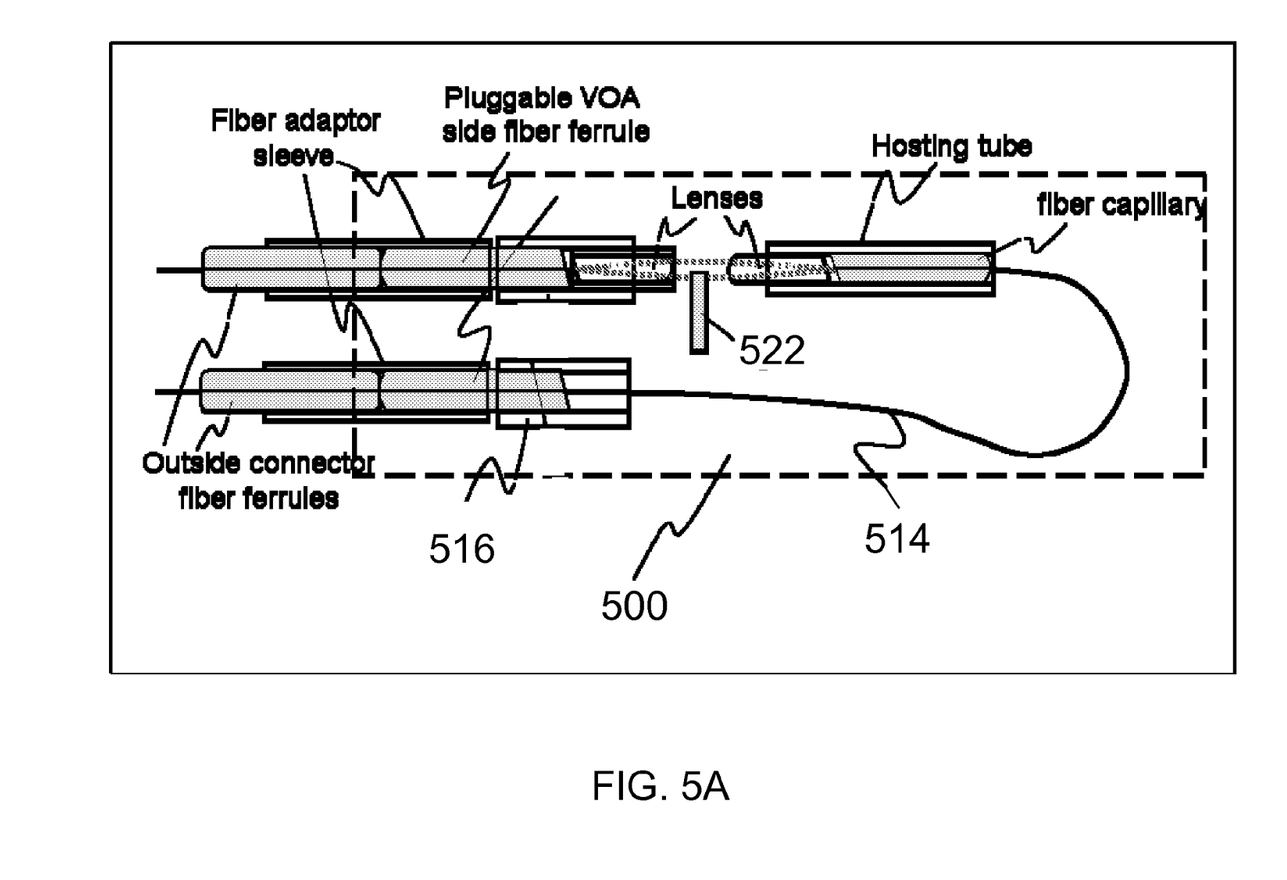
FIG. 5A shows an embodiment of an optically pluggable VOA that uses a transmission type VOA core device with one side fiber ferrule directly inserted into the mating sleeve and the other side through a fiber connector ferrule.

FIG. 5A shows one embodiment of an optical pluggable device that features a transmission type VOA device. Instead of using the input and output fiber connector ferrules to directly interface with their extermanl mating connector ferrules, this transmission type frees-up one port and uses a short section of fiber 514 to fold back the light signal through a connector ferrule which is plugged into the internal side of the mating sleeve 516.

Figure 5B:
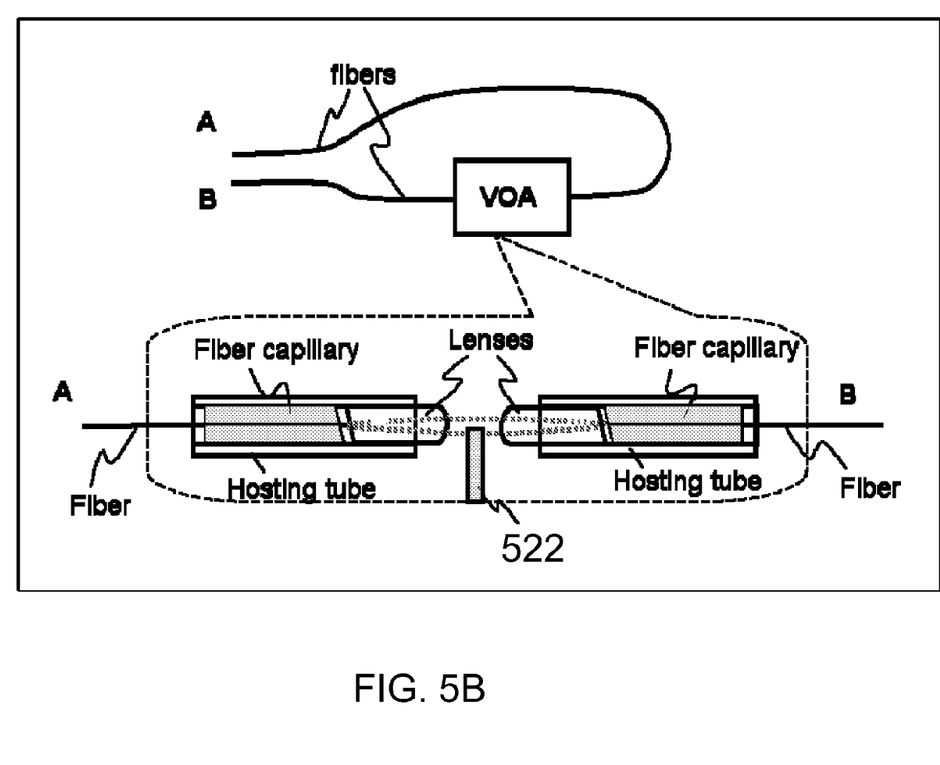
FIG. 5B shows an embodiment of an optically pluggable VOA that uses a transmission type VOA core device with both fiber ferrules inserted into the mating sleeves through fiber connector ferrules.

FIG. 5B shows another embodiment of the invention. In this arrangement, both the input and the output sides of a VOA use fibers and connector ferrules to link to the adaptor. For a compact device, such a fiber may need to be severely bendable or the so-called bend insensitive fiber (BIF) 514 that can fit the loop back in a very compact geometry. The light blocker 522, which can be actuated manually or through an electrical actuator serves to block or attenuate the beam to perform the VOA function. Again the electrical control portion and electrical connector for pluggability portion are omitted in the drawing.

In the embodiments as shown in FIGS. 5A and 5B, the VOA has at least one of its input or output ferrules connected by a fiber before being inserted to a mating sleeve in the optical adapter. That arrangement eases the possible overlimiting of an alignment degree of freedom for the device, and reduces the trasmission of external shock directly through the hard contact in the connectors causing unnecessary impacts to the operation of the VOA.

Figure 6A:
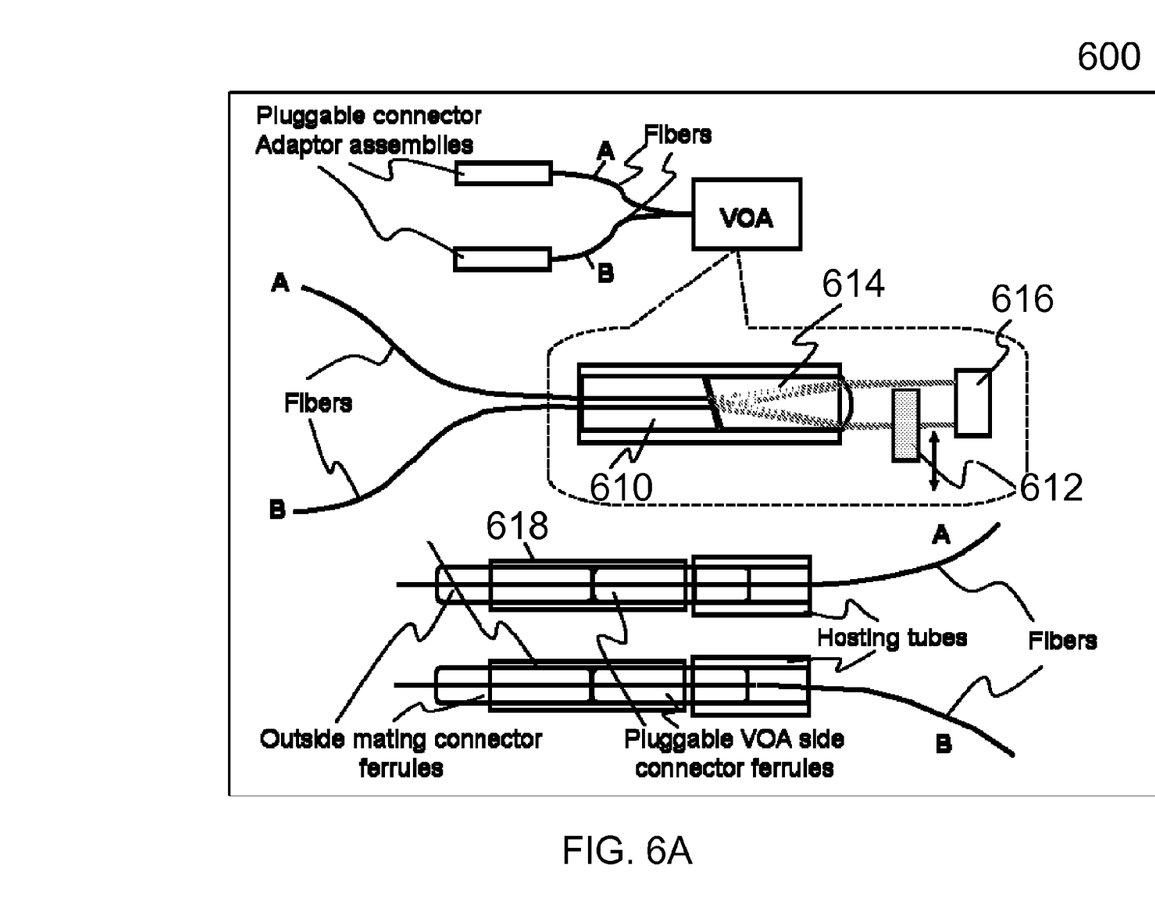
FIG. 6A shows one embodiment of an optically pluggable dual-fiber capillary VOA with beam blocking in reflective mode and fiber exit facing the mating fiber connector sleeves.
Figure 6B:
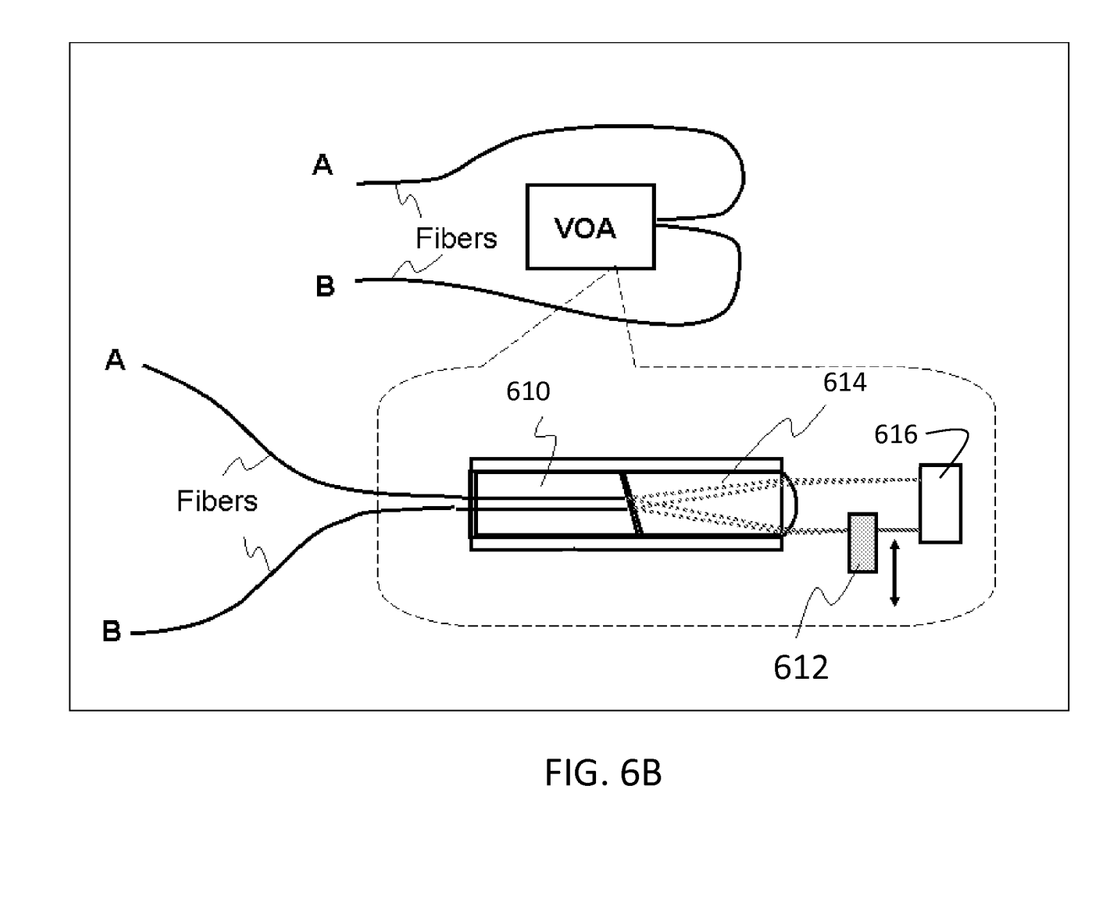
FIG. 6B show another embodiment of an optically pluggable dual-fiber capillary VOA with beam blocking in reflective mode and fiber exit opposing the mating fiber connector sleeves.

FIG. 6A shows one embodiment of another optically pluggable VOA configuration. In a reflective mode of the VOA function, a free-space collimated beam folding back operation is achieved by a set of a dual-fiber capillary 610, a common lens 614 collimating the input and output light beams and an end mirror 616. The beam blocking can be done by manually or electrically actuating a beam blocker 612 situated between the dual-fiber capillary 610 and the end mirror 616. The fibers exit from the VOA directly facing the mating sleeves 618 of the fiber adapter. FIG. 6B shows another embodiment of a VOA with its fibers oriented directly opposite to the mating sleeves for optical pluggability.

Due to the fact that the fibers exiting from the VOA device are closely spaced, they may be split and linked to the internal connector ferrules before being plugged into the mating sleeves. In this way, the VOA device is relieved from being directly coupled to the adapter through rigid hard contacts, and is thus mechamically isolated from the mating adaptors which are fixed to the device body. Again, BIF may be used in either configuration if the geometry is sufficiently tight.

Figure 7A:
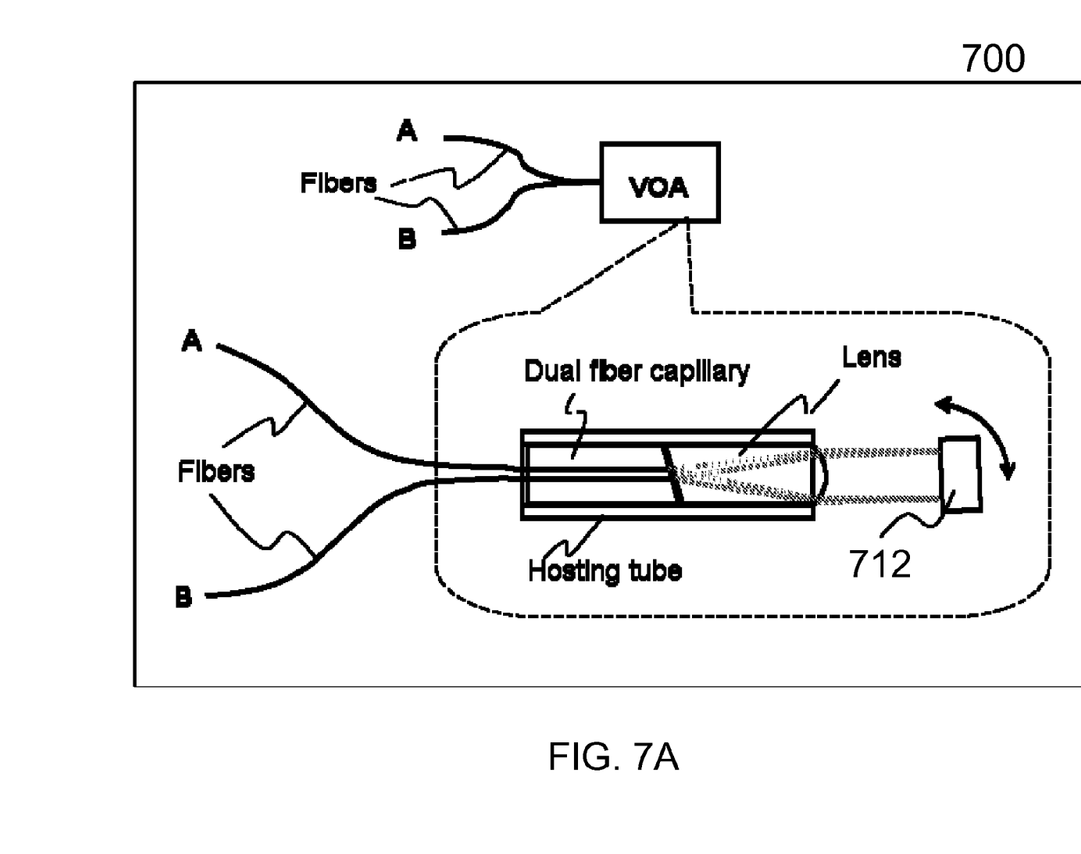
FIG. 7A shows one embodiment of an optically pluggable dual-fiber capillary VOA with attenuation adjusted through tilting of an end mirror and fiber exit facing the mating fiber connector sleeves.
Figure 7B:
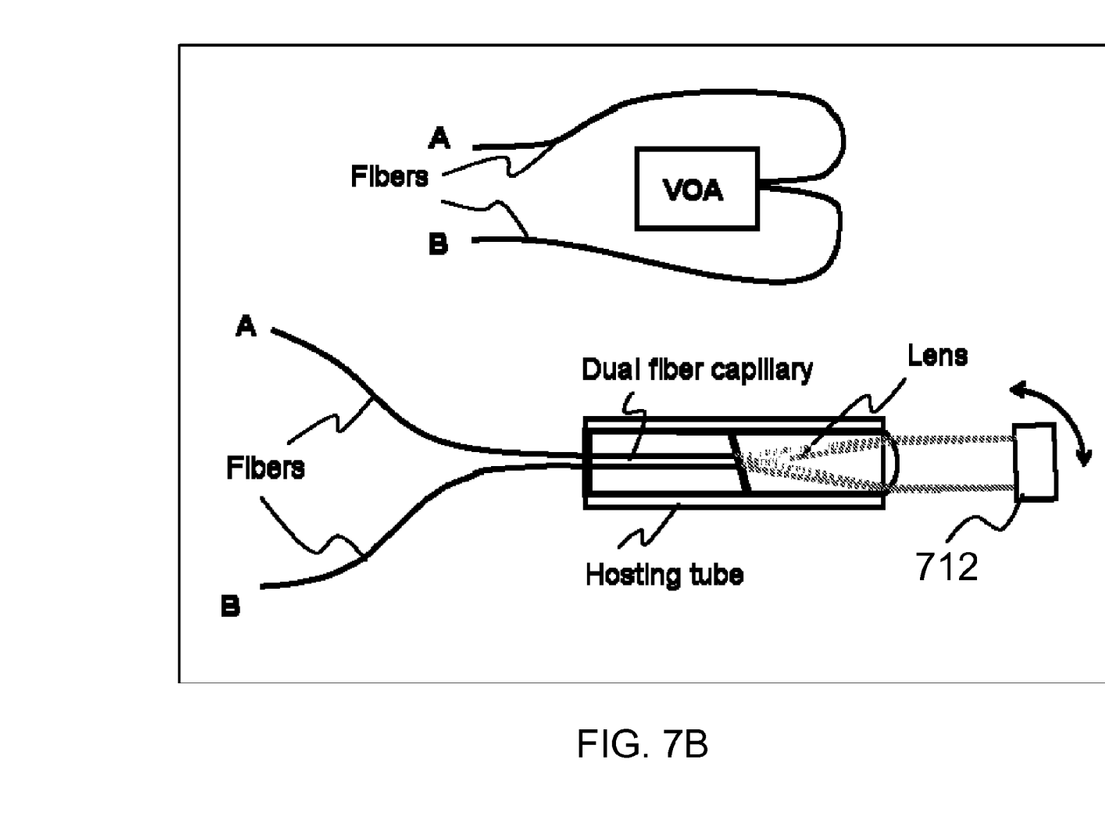
FIG. 7B show another embodiment of an optically pluggable dual-fiber capillary VOA with attenuation adjusted through tilting of an end mirror and fiber exit opposing the mating fiber connector sleeves.

FIG. 7A shows another embodiment 700 for pluggable VOA application. Instead of manupilating a beam blocker to attenuate lights as the embodiment shown in FIG. 6A, the attenuation in FIG. 7A is achieved via tilting an end mirror 712 such that a portion of a light beam is deflected out of a fiber port, thus causing a light loss or attenuation. By varying the end mirror 712, different attenuation levels may be achieved. The fiber exit of the VOA is directly facing the mating sleeves of a fiber adapter. FIG. 7B shows another embodiment of a VOA with its fiber exit oriented directly opposite to the mating sleeves for optical pluggability.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the variable neutral density filter may be replaced by another device that can strengthen an optical signal. Accordingly, the scope of the present invention is defined by the appended claims rather than the foregoing description of embodiments.

What we claim is:

1. A pluggable variable optical attenuator device comprising:
    an enclosure with at least two pluggable connectors so that the pluggable variable optical attenuator device is readily plugged into or removed from a system without interrupting operation of the system, wherein the pluggable connectors, each for an external optical fiber ferrule for optical pluggability, are for receiving a light beam and outputting an attenuated light beam;
    a variable optical attenuator (VOA) including a light beam blocker on an actuator which is controlled externally in reference to an attenuation level, wherein the light beam from one of the pluggable connectors is attenuated by the light beam blocker, and the attenuated light beam is coupled to the other one of the pluggable connectors;
    an electronic reset mechanism to cause the VOA to be in a minimum attenuation state or in a particularly high attenuation state; and
    an electronic control circuit designed to control the actuator with an input from an electronic interface, wherein the VOA, the optical fiber adaptor and the electronic control circuit are housed in the enclosure, the electronic control circuit takes control of the VOA through the electronic interface on the enclosure once the pluggable variable optical attenuator device is plugged into a system.

2. The pluggable variable optical attenuator device as recited in claim 1, wherein the light beam blocker is on an actuator controlled electronically or manually through the electronic interface.

3. The pluggable variable optical attenuator device as recited in claim 1, wherein the electronic control circuit is configured to control the VOA so that the light beam blocker attenuates the light beam electronically.

4. The pluggable variable optical attenuator device as recited in claim 3, further comprising an electrical connector that facilitates a control of the VOA through control commands provided externally through the electronic control circuit that delivers via a combination of voltage and current signals suitable to drive and set the VOA to a right attenuation level.

5. The pluggable variable optical attenuator device as recited in claim 4, wherein the VOA has a reset capability to be either in a minimum attenuation state or in a particularly high attenuation state when the pluggable variable optical attenuator device is not being connected to a hosting system.

6. The pluggable variable optical attenuator device as recited in claim 5, wherein the external commands take the control of the VOA and set an attenuation level within a specification when the pluggable variable optical attenuator device is connected to a hosting system.

7. The pluggable variable optical attenuator device as recited in claim 1, wherein the VOA performs according to an adjusting mechanism manually adjusted by a user.

8. The pluggable variable optical attenuator device as recited in claim 1, wherein each of the ports of the optical fiber adaptor include a ferrule to accommodate a connecting sleeve of an optical fiber.

9. The pluggable variable optical attenuator device as recited in claim 1, further comprising at least a first collimator coupled to the input optical fiber, and a second collimator coupled to the output optical fiber.

10. The pluggable variable optical attenuator device as recited in claim 9, further comprising first and second light turning devices, wherein the light beam from the input optical fiber via the first collimator impinges upon the first light turning device that turns the light beam to the second turning device, where the light beam is attenuated by the VOA before reaching the second turning device, the attenuated light beam is reflected by the second turning device to the output optical fiber via the second collimator.

11. The pluggable variable optical attenuator device as recited in claim 10, wherein each of the first and second turning devices is a prism or a mirror.

12. The pluggable variable optical attenuator device as recited in claim 9, wherein the first and second collimators are disposed facing towards each other, the light beam from the input optical fiber is coupled by the first collimator to the second collimator, where the light beam is attenuated by the VOA before reaching to the second collimator, the second collimator couples the attenuated light beam to the output optical fiber.

13. The pluggable variable optical attenuator device as recited in claim 12, further comprising a bend intensive fiber to turn the light beam from the ports to the first collimator.

14. The pluggable variable optical attenuator device as recited in claim 1, wherein the VOA has a dual-fiber capillary.

15. The pluggable variable optical attenuator device as recited in claim 1, wherein the VOA includes a beam blocker attenuation mechanism controlled to block a portion of the light beam in accordance to a requirement.

16. The pluggable variable optical attenuator device as recited in claim 1, wherein the light beam blocker includes a tilting mirror beam attenuation mechanism to deflect a portion of the light beam in accordance to a requirement.

\* \* \* \* \*